US012810287B2

(12) United States Patent
Yadav et al.

(10) Patent No.: US 12,810,287 B2
(45) Date of Patent: Nov. 24, 2026

(54) METHOD AND SYSTEM FOR CONSENT TO TIME-BOUND QUERIES IN A BLOCKCHAIN

(71) Applicant: MASTERCARD INTERNATIONAL INCORPORATED, Purchase, NY (US)

(72) Inventors: Rakesh Yadav, Cape Elizabeth, ME (US); Steven C. Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 19/013,388

(22) Filed: Jan. 8, 2025

(65) Prior Publication Data

US 2025/0182101 A1 Jun. 5, 2025

Related U.S. Application Data

(63) Continuation of application No. 17/474,601, filed on Sep. 14, 2021, now Pat. No. 12,211,035, which is a (Continued)

(51) Int. Cl.
*G06Q 20/02* (2012.01)
*G06Q 20/06* (2012.01)
(Continued)

(52) U.S. Cl.
CPC ....... *G06Q 20/3825* (2013.01); *G06Q 20/065* (2013.01); *H04L 9/0637* (2013.01); (Continued)

(58) Field of Classification Search
CPC ............ G06Q 20/3825; G06Q 20/065; G06Q 2220/00; G06Q 20/02; H04L 9/0637; (Continued)

(56) References Cited

U.S. PATENT DOCUMENTS 7,353,199 B1 4/2008 DiStefano, III
9,858,781 B1 * 1/2018 Campero ............ G06Q 20/363
(Continued)

FOREIGN PATENT DOCUMENTS

CN 107257341 A * 10/2017 ......... H04L 63/0807

OTHER PUBLICATIONS

U.S. Appl. No. 62/682,336, filed 2018.*
(Continued)

*Primary Examiner* — Duan Zhang
(74) *Attorney, Agent, or Firm* — PANITCH SCHWARZE BELISARIO & NADEL LLP

(57) ABSTRACT

A method for providing consent for provisioning data in an opaque blockchain, includes: receiving, by a receiver of a processing server, a consent request for data associated with the processing server stored on a blockchain, the consent request including at least two digital signatures, where a first digital signature is generated by a regulating entity and a second digital signature is generated by a moderating entity in the blockchain network; validating, by a processing device of the processing server, the first digital signature and the second digital signature; digitally signing, by the processing device of the processing server, the received consent request using a private key of a first cryptographic key pair; and transmitting, by a transmitter of the processing server, the digitally signed consent request to the regulating entity.

18 Claims, 6 Drawing Sheets

Related U.S. Application Data continuation of application No. 16/221,992, filed on Dec. 17, 2018, now Pat. No. 11,138,598.

(51) Int. Cl.

| | |
|---|---|
| ***G06Q 20/38*** | (2012.01) |
| ***H04L 9/06*** | (2006.01) |
| ***H04L 9/08*** | (2006.01) |
| ***H04L 9/14*** | (2006.01) |
| ***H04L 9/32*** | (2006.01) |
| *H04L 9/00* | (2022.01) |

(52) U.S. Cl.

CPC .............. *H04L 9/0825* (2013.01); *H04L 9/14* (2013.01); *H04L 9/3247* (2013.01); *G06Q 2220/00* (2013.01); *H04L 9/50* (2022.05)

(58) Field of Classification Search

CPC ....... H04L 9/0825; H04L 9/14; H04L 9/3247; H04L 9/50; H04L 9/088; H04L 63/00; H04L 9/3239

See application file for complete search history.

(56) References Cited

U.S. PATENT DOCUMENTS

| | | | | |
|---|---|---|---|---|
| 10,243,748 | B1 | 3/2019 | Callan et al. | |
| 10,523,443 | B1 | 12/2019 | Kleinman | |
| 10,708,046 | B1 | 7/2020 | Ashrafi | |
| 11,144,660 | B2 * | 10/2021 | Latka | H04L 9/3239 |
| 11,153,097 | B1 * | 10/2021 | Griffin | H04L 9/3263 |
| 11,216,788 | B1 | 1/2022 | Vijayaraghavan | |
| 2003/0046534 | A1 | 3/2003 | Alldredge | |
| 2003/0130867 | A1 * | 7/2003 | Coelho | G16H 10/60 709/217 |
| 2005/0201561 | A1 | 9/2005 | Komano et al. | |
| 2009/0089803 | A1 * | 4/2009 | Biggs | G06F 21/554 726/21 |
| 2016/0182487 | A1 | 6/2016 | Zhu et al. | |
| 2016/0254910 | A1 * | 9/2016 | Finlow-Bates | H04L 9/0891 713/158 |
| 2016/0292672 | A1 | 10/2016 | Fay et al. | |
| 2017/0132626 | A1 | 5/2017 | Kennedy | |
| 2017/0148016 | A1 | 5/2017 | Davis | |
| 2017/0149560 | A1 | 5/2017 | Shah | |
| 2017/0244721 | A1 | 8/2017 | Kurian et al. | |
| 2017/0344987 | A1 | 11/2017 | Davis | |
| 2018/0324175 | A1 * | 11/2018 | Campagna | H04L 9/0825 |
| 2018/0349644 | A1 * | 12/2018 | Lee | G06Q 20/3829 |
| 2019/0034926 | A1 | 1/2019 | Davis | |
| 2019/0073678 | A1 | 3/2019 | Lunn et al. | |
| 2019/0228133 | A1 | 7/2019 | Ansari et al. | |
| 2019/0317924 | A1 | 10/2019 | Alimi et al. | |
| 2019/0378127 | A1 | 12/2019 | Dudar et al. | |
| 2020/0005410 | A1 | 1/2020 | McKee | |
| 2020/0014664 | A1 * | 1/2020 | Brown | G06F 16/182 |
| 2020/0228349 | A1 | 7/2020 | Basu et al. | |
| 2020/0322164 | A1 | 10/2020 | Shirai | |
| 2020/0344051 | A1 | 10/2020 | Ashrafi | |

OTHER PUBLICATIONS

Extended Europen Search Report dated Aug. 24, 2022 in corresponding European Application No. 19898970.9-1218, 6 pps.

Garzik, Jeff, "Public versus Private Blockchains—Part 1: Permissioned Blockchains, White Paper", BitFury Group, Oct. 20, 2015, pp. 1-23.

Notification of Transmittal of the International Search Report (Forms PCT/ISA/220 and PCT/ISA/210) and the Written Opinion of the International Searching Authority (Form PCT/ISA/237) issued on Mar. 9, 2020, by the International Application Division Korean Intellectual Property Office in corresponding International Application No. PCT/US2019/061620. (9 pages).

Extended European Search Report, issued May 3, 2024 in corresponding EP Application No. 24153242.3-1218, 9 pages.

Examination Report issued on Mar. 10, 2026 in corresponding EP Application No. 24 153 242.3 (6 pages).

* cited by examiner

100

300

400

500

METHOD AND SYSTEM FOR CONSENT TO TIME-BOUND QUERIES IN A BLOCKCHAIN

FIELD

The present disclosure relates to the automatic provisioning of data for an opaque blockchain on prior consent, specifically the use of consent as a precursor to access of data that is not available on an opaque blockchain for verification using the opaque blockchain.

BACKGROUND

Blockchains are often used as a beneficial data storage tool. The immutable nature of a blockchain provides a reliable and secure way of storing data, as well as making the data auditable and independently verifiable, because it cannot be changed. As a result, while blockchains were initially created for use in transacting with cryptographic currencies, they have begun to be used as an alternative to traditional public or private databases.

Traditionally, blockchains have often been public, both in terms of entities that can participate in a blockchain as well as the entities that can access the data stored in a blockchain. However, there are cases where entities may be interested in the immutability and auditability benefits of using a blockchain as storage, but where the data that needs to be stored may be too sensitive to be made publicly accessible. In these cases, private and permissioned blockchains are often used. These types of blockchains restrict access (to contribute to the blockchain and/or view blockchain data) to authorized entities.

However, there are also instances where a private or permissioned blockchain may not be enough. In these instances, an opaque blockchain can be used. An opaque blockchain is a permissioned blockchain where the data stored in the blockchain has been hashed prior to storage. As a result, only entities that were privy to the underlying information will be aware of what the hashed values represent, while still retaining the immutability and auditability of the blockchain. Additional information regarding opaque blockchains can be found in U.S. Published Patent Application No. 2017-0148016, entitled "Method and System for Gross Settlement By Use of an Opaque Blockchain," by Steven Charles Davis, published on May 25, 2017, which is herein incorporated by reference in its entirety.

In an opaque blockchain, because the data stored therein is hashed, it can become impossible for a third party entity, such as a regulator, to audit or perform independent verification of the underlying data, such as safety inspections, emissions tests, payment transactions, etc. As such, the only way a third party entity could access the underlying data would be to request the data from an involved entity, such as the entity that had an inspection done or performed an inspection. However, systems that utilize opaque blockchains do not have any mechanisms in place for the sharing of such data, in particular sharing the data while retaining the protections afforded by the use of an opaque blockchain. Thus, there is a need for a technological system where consent can be verified and auditable as a precursor to having underlying data for an opaque blockchain being provided to a third party.

SUMMARY

The present disclosure provides a description of systems and methods for automatically provisioning data for an opaque blockchain based on prior consent. When a regulatory entity wants to obtain underlying data for an opaque blockchain, such as transactional data, the entity may request consent from their target. To ensure that the request comes from the genuine regulatory entity, the regulatory entity signs the request and also has a moderating entity, sign the request. The request is provided to the target entity, which can verify both signatures. The target entity signs the request if they provide consent, and returns the signed consent back to the regulatory entity. In some cases, a second blockchain can be used to store signed consents, to provide for further auditing and verification capabilities. The regulatory entity is then free to submit requests for data to the target entity, which can be automatically honored by its system and the data returned to the regulatory entity. Using the opaque blockchain, the regulatory entity can verify that they were provided with accurate and genuine data, and perform their regulatory functions accordingly. The result is that informed consent is provided and registered prior to un-hashed data being made available for an opaque blockchain, protecting all entities involved while still enabling regulatory agencies to operate.

A method for providing consent for provisioning data in an opaque blockchain, includes: receiving, by a receiver of a processing server, a consent request for data associated with the processing server stored on a blockchain, the consent request including at least two digital signatures, where a first digital signature is generated by a regulating entity and a second digital signature is generated by a moderating entity in the blockchain network; validating, by a processing device of the processing server, the first digital signature and the second digital signature; digitally signing, by the processing device of the processing server, the received consent request using a private key of a first cryptographic key pair; and transmitting, by a transmitter of the processing server, the digitally signed consent request to the regulating entity.

A system for providing consent for provisioning data in an opaque blockchain includes: a receiver of a processing server configured to receive a consent request for data associated with the processing server stored on a blockchain, the consent request including at least two digital signatures, where a first digital signature is generated by a regulating entity and a second digital signature is generated by a moderating entity in a blockchain network; validating, by a processing device of the processing server, the first digital signature and the second digital signature; digitally signing, by the processing device of the processing server, the received consent request using a private key of a first cryptographic key pair; and transmitting, by a transmitter of the processing server, the digitally signed consent request to the regulating entity.

A method for providing consent for provisioning data in an opaque blockchain based on prior consent includes: receiving, by a receiver of a processing server, a consent request for data associated with a target entity stored on a blockchain, the consent request including digital signature generated by a regulating entity using a private key of a first cryptographic key pair; validating, by a processing device of the processing server, the digital signature of the regulating entity using a public key of the first cryptographic key pair; digitally signing, by the processing device of the processing server, the received consent request using a private key of a second cryptographic key pair; transmitting, by a transmitter of the processing server, the digitally signed consent request to the target entity; receiving, by the receiver of the processing server, a consent message digitally signed using a private key of a third cryptographic key pair from the target entity, the consent message granting the regulating entity access to the data associated with the target entity stored on the blockchain; validating, by a processing device of the processing server, the digitally signed consent message using a public key of the third cryptographic key pair; and transmitting, by a transmitter of the processing server, the digitally signed consent request to the regulating entity.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain-A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Provisioning Data for an Opaque Blockchain

Figure 1:
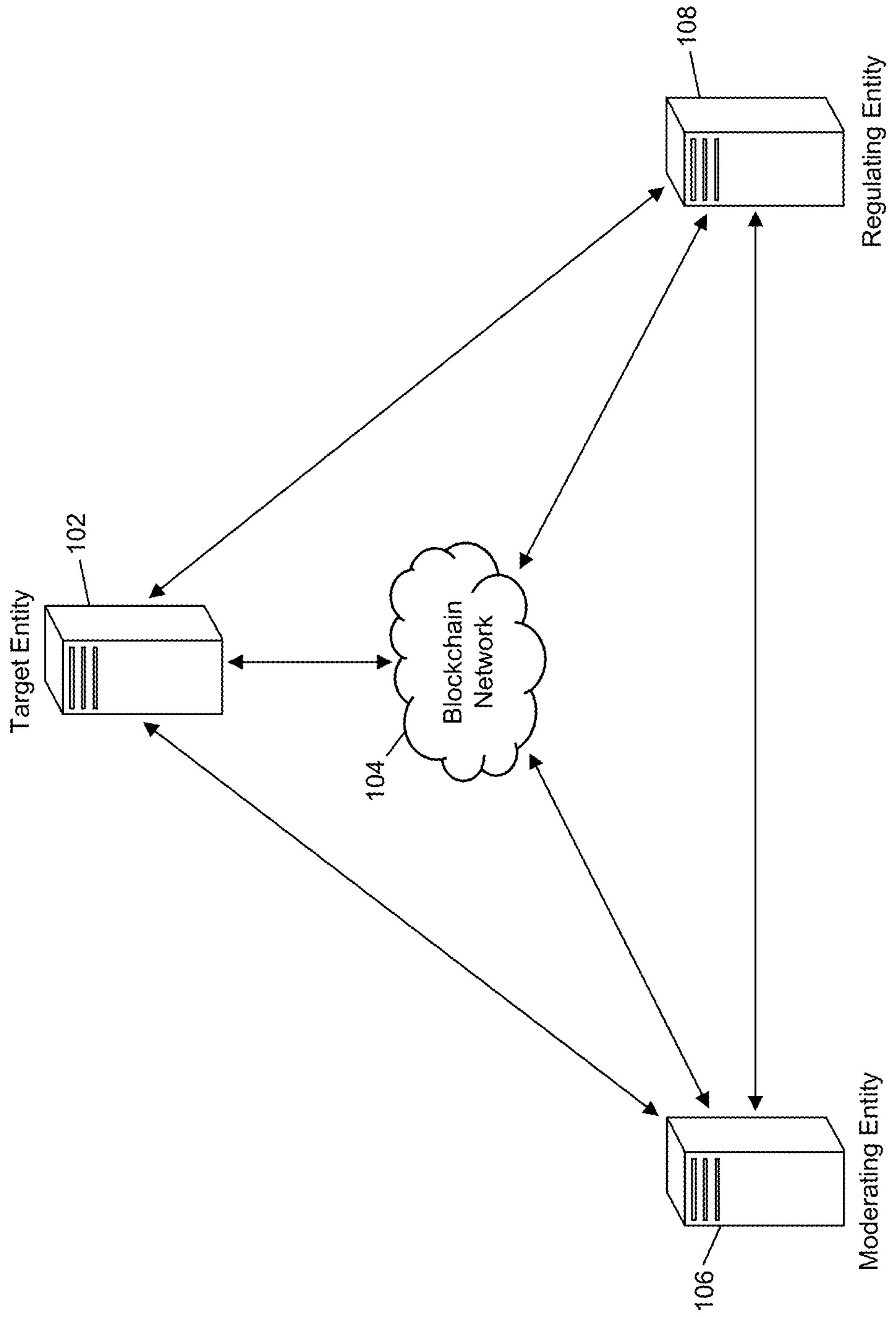
FIG. 1 is a block diagram illustrating a high level system architecture for automatically provisioning data for an opaque blockchain based on prior consent in accordance with exemplary embodiments.

FIG. 1 illustrates a system 100 for the use of consent in providing data related to entries in an opaque blockchain to a third party, such as a regulatory entity.

In the system 100, a target entity 102 may interact with an opaque blockchain, such as may be associated by a blockchain network 104. The opaque blockchain may be used to store hashed references to other data that may be stored by the target entity 102. For instance, in one example, the target entity 102 may be a merchant, financial institution, or other entity that engages in electronic payment transactions, where the hashed references stored in the opaque blockchain may be hashes of the electronic payment transactions involving the target entity 102. In the system 100, the target entity 102 may store all of the underlying data involving the target entity 102. For instance, in the above example, the target entity 102 may store the transactional data for the electronic payment transactions involving the target entity 102, while the opaque blockchain may only include the hash values. In the system 100, electronic payment transactions may include cryptographic currency transactions conducted using a blockchain, traditional payment transactions (e.g., debit card or credit card transactions), etc.

The system 100 may include a moderating entity 106. The moderating entity 106 may be an entity that is configured to moderate interactions with and use of the opaque blockchain. In an exemplary embodiment, the moderating entity 106 may be a node in the blockchain network 104. In some instances, the moderating entity 106 may operate all nodes in the blockchain network 104. In some cases, any entity that participates in the blockchain must be approved by the moderating entity 106. For instance, the moderating entity 106 may assign private keys or other data for use in participating with the blockchain to target entities 102 and other entities to be eligible for participation in the blockchain.

The blockchain network 104 may be comprised of a plurality of nodes, which may include the moderating entity 106 as a node thereof. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the data reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

In the system 100, the blockchain may be an opaque blockchain, such that each blockchain data value included therein includes a hash value. For instance, in the above example, each blockchain data value is a hash of an electronic payment transaction. In some cases, a blockchain data value may only include a single hash value. In other cases, a blockchain data value may include a hash value and additional information, such as identifying information, such as a digital signature, unique identification value, etc. As discussed in more detail below, in some embodiments, the system 100 may include an additional blockchain, where the blockchain data values included therein may include non-hashed data.

In the system 100, a regulating entity 108 may have a need to view detailed information about the activities of the target entity 102. For instance, in the above example, the regulating entity 108 may be a governmental agency or other regulator that needs to see the detailed electronic transaction data of the target entity 102 to check for compliance with applicable laws and regulations. Because the system 100 uses an opaque blockchain, the regulating entity 108 may have access to the opaque blockchain, but may not be able to perform any validation or checks regarding the target entity 102 because of the data in the opaque blockchain being stored in a hashed form. As a result, the regulating entity 108 may be interested in obtaining the original, non-hashed data from the target entity 102.

In an effort to protect the target entity 102 and have accountability for all parties involved, the moderating entity 106 may enforce that each target entity 102 provides explicit consent to regulating entities 108 prior to any data being furnished thereto. The regulating entity 108 may submit a consent request to the moderating entity 106. The consent request may specify the target entity 102 from whom consent is requested. In some cases, the consent request may also specify the data that is being requested by the regulating entity 108. The consent request may also be digitally signed by the regulating entity 108. The digital signature may be generated by a private key of a cryptographic key pair associated with the regulating entity 108, where the other entities in the system 100 have a copy of the corresponding public key. As discussed herein, the keys associated with the regulating entity 108 may be referred to as "regulator" keys. The moderating entity 106 and target entity 102 may each have key pairs associated with the respective entities, referred to here as "moderator" keys and "target" keys, respectively.

The regulating entity 108 may digitally sign the consent request that gets submitted to the moderating entity 106 using any suitable communication network and method. The moderating entity 106 may receive the consent request and validate the digital signature using the regulator public key. If the validation is successful, the moderating entity 106 may digitally sign the consent request itself, using its moderating private key. The moderating entity 106 may then return the signed consent request to the regulating entity 108. The regulating entity 108 may then forward the twice-signed consent request to the target entity 102. In some embodiments, the moderating entity 106 may forward the twice-signed consent request directly to the target entity 102. Communications may be made with the target entity 102 using any suitable communication network and method.

When the target entity 102 receives the consent request, the target entity 102 may validate both digital signatures using the regulator public key and the moderator public key. If either validation fails, the target entity 102 may refuse to provide consent as it may not be assured of the identities of the regulating entity 108 or moderating entity 106, as applicable, or the genuineness of the consent request. If the validations are successful, the target entity 102 may decide to give consent. The consent may be consent to produce data regarding actions performed by or involving the target entity 102, where the corresponding data is stored in the opaque blockchain in hashed format. To provide their consent, the target entity 102 may return a digitally signed consent message to the regulating entity 108, which may be signed with the target private key. In some cases, the consent request may be signed by the target entity 102 and used as the consent message. In other cases, the consent message may be a separate data message. In some instances, the consent message may specify the data for which the regulating entity 108 is provided consent. In some cases, the consent given by the target entity 102 may be time-bound. For example, the consent may expire after a predetermined period of time, which may be set in the consent message, the consent request, specified by the moderating entity 106, etc. In such cases, the regulating entity 108 may only have access to the appropriate data during the allowed period of time.

In some embodiments, a copy of the digitally signed consent message may be stored. In one embodiment, the digitally signed consent message may be stored in a database, such as by the target entity 102, moderating entity 106, regulating entity 108, and/or nodes in the blockchain network 104. In another embodiment, a blockchain may be used for storage of digitally signed consent messages. In some cases, the blockchain may be a second blockchain in addition to the opaque blockchain, where the second blockchain may not be opaque. In other cases, the blockchain may be partitioned, with one partition used to store hash values for the opaque blockchain, and the other partition used to store digitally signed consent messages. The storage of signed consent messages in a blockchain may provide for greater security and accountability, enabling both target entities 102 and regulating entities 108 to have access to a record showing that consent was given and the terms of the consent (e.g., what data was allowed to be accessed and when).

The target entity 102 may return the digitally signed consent message to the regulating entity 108, directly or via the moderating entity 106. The moderating entity 106 and/or regulating entity 108 may validate the signed consent message using the target public key, such as to ensure that the intended target entity 102 gave the consent and not a fraudster. The regulating entity 108 may be free to request data from the target entity 102 in compliance with the given consent. The regulating entity 108 may transmit an executable query to the target entity 102. The target entity 102 may receive the query, which may be executed by its computing systems to identify data that is requested by the regulating entity 108. In some cases, the target entity 102 may first evaluate the executable query to ensure that it complies with the given consent (e.g., it does not request data that has not been consented-to). The executable script may be executed, the targeted data identified, and then the targeted data returned to the regulating entity 108. In some embodiments, the actions involving the retrieval of data executed by the target entity 102 may be done automatically. For instance, the target entity 102 may receive the executable query, evaluate the executable query for compliance, execute the query, and return the identified data to the regulating entity 108 automatically (e.g., without any confirmation of actions or performance of any actions by a user of the target entity's systems). In such cases, data can be quickly identified and provided to regulating entities 108 with minimal intrusion to the target entity 102, and where there is a clear record of the consent to such data being accessed.

In some cases, the targeted data may be encrypted before it is provided to the regulating entity 108. In some instances, the targeted data may be encrypted using the regulator public key in possession of the target entity 102, for decryption by the regulating entity 108 using the regulator private key. In some cases, the key pair used for the encryption and decryption may be the same key pair used for generation and validation of the digital signature associated with the regulating entity 108. In other cases, a different key pair may be used for the encryption. In some instances, other suitable methods for encryption may be used, such as use of Elliptic-curve cryptography, symmetrical keys, shared secrets, etc.

The regulating entity 108 may receive the targeted data and may (e.g., after decryption, if applicable), perform any necessary functions using the targeted data, such as for checking compliance with rules or regulations applicable to the target entity 102. In some embodiments, the regulating entity 108 may verify the targeted data supplied by the target entity 102. In such an embodiment, the regulating entity 108 may hash the received targeted data and compare the resulting hash values to hash values stored in the blockchain data values in the opaque blockchain. If the hashes of the targeted data are the same as the hash values stored in the opaque blockchain, then the targeted data supplied to the regulating entity 108 may be genuine and accurate. If any hashes of the targeted data do not have counterparts in the opaque blockchain, then the data may be inaccurate. In some cases, inaccurate data may be a result of fraud, incomplete information, or other situation that may require more investigation by the regulating entity 108. In some embodiments, the moderating entity 106 may perform validation of the received targeted data on behalf of the regulating entity 108.

In some embodiments, the target entity 102 may be configured to revoke consent. In such embodiments, the target entity 102 may generate and digitally sign a revocation message. The revocation message may be provided to the regulating entity 108, moderating entity 106, or a node in the blockchain network 104. The digital signature of the revocation message may be verified using the target public key, and the revocation message stored in the blockchain or other database used to store the consent message. In cases where revocations are allowed, the target entity's systems may look for a revocation prior to executing any executable script to identify targeted data. In some cases, regulating entities 108 may check for revocations before submitting executable scripts to the appropriate target entities 102.

The methods and systems discussed herein provide for the automatic provisioning of data that is associated with hashed values stored in an opaque blockchain, which is done with explicit consent provided by the target entity 102. The use of digital signatures ensures that each entity is verifiable as the true entity by each other party in the system 100, while the use of signed consent messages provides a verifiable record to both target entities 102 and regulating entities 108 of consent for the providing of data, providing both entities with greater security and accountability. The signed consent also enables the automatic identification and supply of targeted data, which provides faster and easier access to the data, which can then be verified against the opaque blockchain. The result is a system that provides verifiable data with verifiable consent quickly and efficiently in a manner that is impossible in traditional systems, due to the use of additional technologies and combination thereof.

Processing Server

Figure 2:
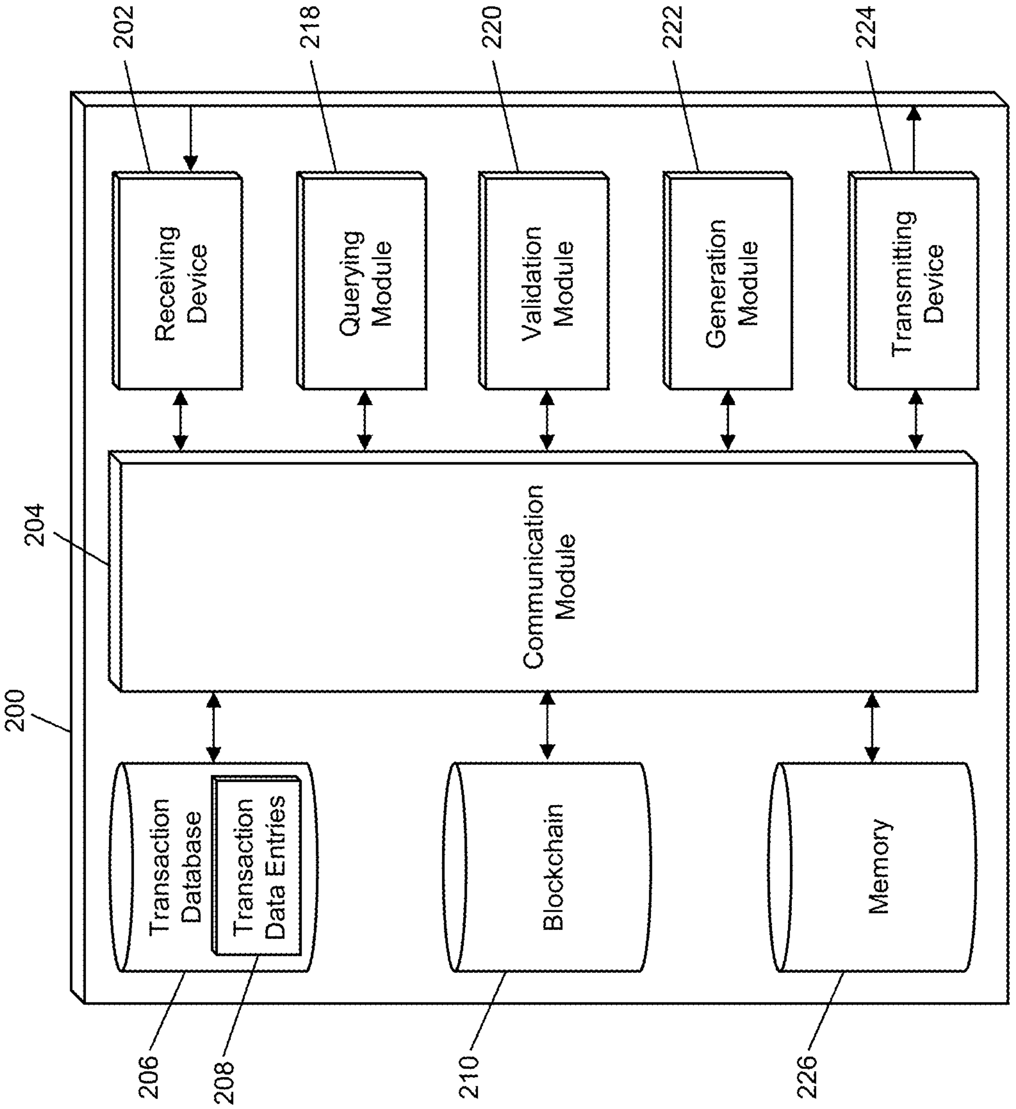
FIG. 2 is a block diagram illustrating a processing server of the target entity in FIG. 1 for providing consent to the automatic provisioning of data for an opaque blockchain in accordance with exemplary embodiments.

FIG. 2 illustrates an embodiment of a processing server 200, such as may be part of the target entity 102 in the system 100. It will be apparent to persons having skill in the relevant art that the embodiment of the processing server 200 illustrated in FIG. 2 is provided as illustration only and may not be exhaustive to all possible configurations of the processing server 200 suitable for performing the functions as discussed herein. For example, the computer system 600 illustrated in FIG. 6 and discussed in more detail below may be a suitable configuration of the processing server 200.

The processing server 200 may include a receiving device 202. The receiving device 202 may be configured to receive data over one or more networks via one or more network protocols. In some instances, the receiving device 202 may be configured to receive data from blockchain network nodes, moderating entities 106, regulating entities 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by moderating entities 106 and/or regulating entities 108 that may be superimposed or otherwise encoded with twice-signed consent requests. The receiving device 202 may also be configured to receive data signals electronically transmitted by regulating entities, which may be superimposed or otherwise encoded with executable queries for use in identifying targeted data. In some cases, the receiving device 202 may be configured to receive data electronically transmitted by nodes in the blockchain network 104, which may be superimposed or otherwise encoded with signed consent requests, requests for data, opaque blockchain hash values, etc.

The processing server 200 may also include a communication module 204. The communication module 204 may be configured to transmit data between modules, engines, databases, memories, and other components of the processing server 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 200 and external components of the processing server 200, such as externally connected databases, display devices, input devices, etc. The processing server 200 may also include a processing device. The processing device may be configured to perform the functions of the processing server 200 discussed herein as will be apparent to persons having skill in the relevant art. In some embodiments, the processing device may include and/or be comprised of a plurality of engines and/or modules specially configured to perform one or more functions of the processing device, such as a querying module 218, validation module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 200 may include a transaction database 206. The transaction database 206 may be configured to store a plurality of transaction data entries 208 using a suitable data storage format and schema. The transaction database 206 may be a relational database that utilizes structured query language for the storage, identification, modifying, updating, accessing, etc. of structured data sets stored therein. Each transaction data entry 208 may be related to an electronic payment transaction involving the target entity 102, which may include any data associated therewith, such as the data hashed for storage in the opaque blockchain. As will be apparent to persons having skill in the relevant art, the transaction database 206 is used to store transaction data entries 208 in embodiments where the opaque blockchain is used to store transactional data. In embodiments where other type of data involving target entities 102 is stored, the transaction database 206 may be suited to storing such data therein.

The processing server 200 may also include at least one blockchain 210. The blockchain 210, as discussed in more detail above, may be comprised of a plurality of blocks, wherein each block includes a header and one or more blockchain data values. In some cases, the processing server 200 may store a copy of the opaque blockchain. In some instances, only hash values related to the target entity 102 (e.g., hashes of the transaction data entries 208) may be stored in the local copy of the blockchain 210. In embodiments where a blockchain is used to store signed consent messages, the blockchain 210 may include the consent messages signed by the target entity 102.

The processing server 200 may include a querying module 218. The querying module 218 may be configured to execute queries on databases to identify information. The querying module 218 may receive one or more data values or query strings, and may execute a query string based thereon on an indicated database, such as the transaction database 206, to identify information stored therein. The querying module 218 may then output the identified information to an appropriate engine or module of the processing server 200 as necessary. The querying module 218 may, for example, execute executable queries received from regulating entities 108 for use in identifying targeted data for providing to the respective regulating entity 108.

The processing server 200 may also include a validation module 220. The validation module 220 may be configured to perform validations for the processing server 200 as part of the functions discussed herein. The validation module 220 may receiving instructions as input, may perform a validation as instructed, and may output a result of the validation to another module or engine of the processing server 200. In some cases, data to be used in the validation may be included in the input. In some instances, the validation module 220 may be configured to identify data for use in the verification, such as by instructing the querying module 218 to perform one or more queries for data. The validation module 220 may, for example, be configured to validate digital signatures using the appropriate public keys. The validation module 220 may also be configured to validate transaction data entries 208 by checking hashes thereof against hash values stored in the opaque blockchain.

The processing server 200 may also include a generation module 222. The generation module 222 may be configured to generate data for use by the processing server 200 in performing the functions discussed herein. The generation module 222 may be configured to receive instructions as input, generate data as instructed, and output the generated data to another module or engine of the processing server 200. The generation module 222 may be provided with data to be used in the generation as part of the input, and/or may be configured to identify additional data to be used in the generation, such as by instructing the querying module 218 to identify such data. The generation module 222 may be configured to, for example, generate digital signatures using target private keys, generate encrypted data using regulator public keys, generate hash values from data using hashing algorithms, generate consent messages, generate revocation messages, etc.

The processing server 200 may also include a transmitting device 224. The transmitting device 224 may be configured to transmit data over one or more networks via one or more network protocols. In some instances, the transmitting device 224 may be configured to transmit data to nodes in blockchain networks 104, moderating entities 106, regulating entities 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to moderating entities 106, regulating entities 108, and/or nodes in the blockchain network 104 that may be superimposed or otherwise encoded with digitally signed consent messages and, if applicable, digitally signed revocation messages. The transmitting device 224 may also be configured to electronically transmit data signals that are superimposed or otherwise encoded with transactional or other data, which may be encrypted, to regulating entities 108, which may be transmitted directly or via the moderating entity 106.

The processing server 200 may also include a memory 226. The memory 226 may be configured to store data for use by the processing server 200 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 200 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, communication data for blockchain nodes, communication data for moderating entities 106 and regulating entities 108, public keys, private keys, etc.

Process for Consenting to Access of Targeted Data

Figure 3:
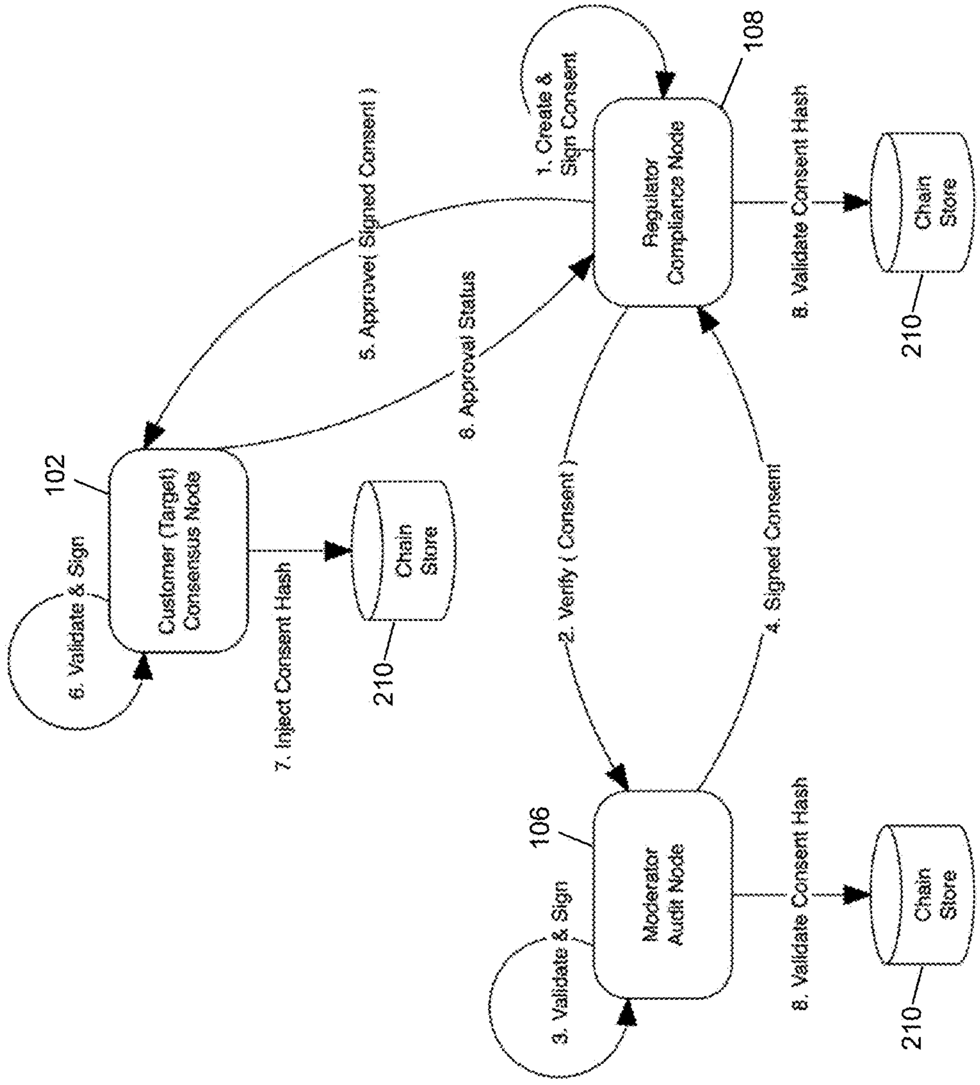
FIG. 3 is a flow diagram illustrating a process for providing and registering consent to the automatic provisioning of data for an opaque blockchain in the system of FIG. 1 in accordance with exemplary embodiments.

FIG. 3 illustrates an example process 300 for the providing of explicit consent to the access of targeted data associated with an opaque blockchain in the system 100 of FIG. 1.

In step 1 of the process 300, the regulating entity 108 (illustrated as the "regulator compliance node" 108) may generate a consent request for requesting consent to targeted data and digitally sign the consent request using a regulator private key. In some cases, the consent request may specify the targeted data for which consent is being requested. In step 2 of the process 300, the signed consent request may be transmitted to the moderating entity 106 (illustrated as the "moderator audit node" 106) using a suitable communication network and method. In step 3 of the process 300, the moderating entity 106 may validate the regulating entity's digital signature using the regulator public key and, if validation is successful, digitally sign the consent request itself using the moderator private key. In some cases, the signed consent request may be signed a second time by the moderating entity 106. In other cases, the moderating entity's signature may replace the regulating entity's signature.

In step 4 of the process 300, the twice-signed consent request may be returned back to the regulating entity 108 by the moderating entity 106. In step 5 of the process 300, the twice-signed consent request may be forwarded on to the target entity 102 (illustrated as the "customer (target) consensus node" 102) by the regulating entity 108. In some embodiments, the twice-signed consent request may be forwarded to the target entity 102 directly by the moderating entity 106 after the moderating entity 106 signs the consent request. In some such embodiments, step 4 may be performed after or concurrently with step 5, or may be an optional step. In step 6 of the process 300, the target entity 102 may validate the regulating entity's digital signature using the regulator public key, and may also validate the moderating entity's digital signature using the moderator public key. The target entity 102 may also digitally sign the consent request or a separate consent message using the target private key. In step 7 of the process 300, the target entity 102 may store (e.g., inject) the signed consent message in a database thereof, such as in the blockchain 210 (illustrated as the "chain store" 210).

In step 8 of the process 300, the target entity 102 may return the signed consent message or an indication that consent is approved to the regulating entity 108. As part of the indication of approved consent, the regulating entity 108 and moderating entity 106 can each validate the signed consent message that was stored in the blockchain 210 by viewing their local copy of the blockchain 210 and validating the digital signature of the consent message using the target public key. The blockchain 210 may thus have an immutable record of the validated consent provided by the target entity 102 to provide targeted data to the regulating entity 108.

Process for Retrieval of Targeted Data

Figure 4:
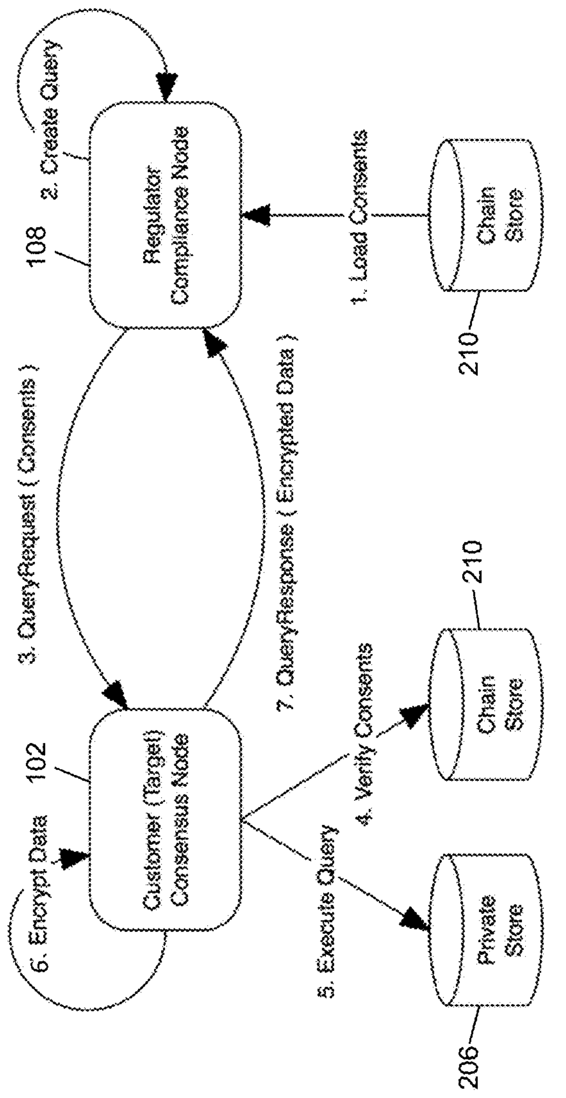
FIG. 4 is a flow diagram illustrating a process for automatically providing underlying data corresponding to data in an opaque blockchain based on prior consent in the system of FIG. 1 in accordance with exemplary embodiments.

FIG. 4 illustrates a process 400 for the retrieval of targeted data from the target entity 102 by the regulating entity 108 in the system 100 of FIG. 1, such as following the providing of consent by the target entity 102, such as using the process 300 illustrated in FIG. 3 and discussed above.

In step 1 of the process 400, the regulating entity 108 may review the blockchain 210 to load the active consents provided by the target entity 102, such as to ensure that the target entity 102 did not revoke a previously-provided consent. If there is an active consent, then, in step 2 of the process 400, the regulating entity 108 may generate an executable query that is designed to identify targeted data that is in compliance with the consent provided by the target entity 102. In step 3 of the process 400, the regulating entity 108 may electronically transmit the executable query to the target entity 102 using a suitable communication network and method.

In step 4 of the process 400, the target entity 102 may verify that it has provided consent for the targeted data that is being requested in the executable query, and that the consent is still active (e.g., has not been revoked), such as by viewing the consent messages and revocation messages stored in the blockchain 210. In step 5 of the process 400, the target entity 102 may execute the executable query to identify the targeted data, such as by identifying transaction data entries 208 stored in the transaction database 206 (illustrated as the "private store" 206) and data stored therein. In step 6 of the process 400, the target entity 102 may encrypt the identified targeted data using the regulator private key. In step 7 of the process 400, the encrypted targeted data may be transmitted to the regulating entity 108 using a suitable communication network and method. The regulating entity 108 may then be free to decrypt the data using the regulator public key, and validate the data as desired using the hash values in the opaque blockchain.

Figure 5:
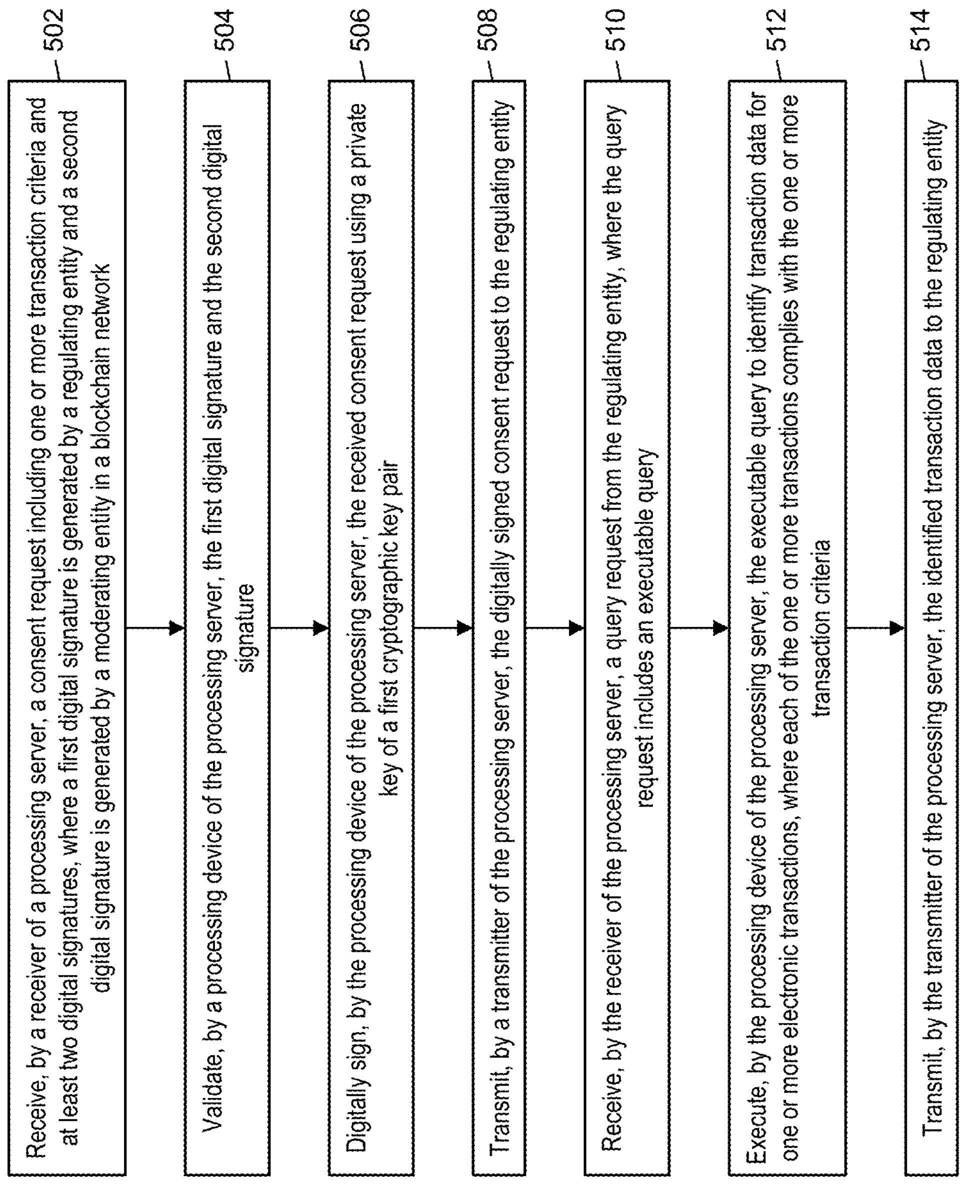
FIG. 5 is a flow chart illustrating an exemplary method for automatically provisioning data for an opaque blockchain based on prior consent in accordance with exemplary embodiments.

Exemplary Method for Provisioning Data for an Opaque Blockchain Based on Prior Consent FIG. 5 illustrates a method 500 for the providing of data related to hashed values in an opaque blockchain based on consent given by the provider of the data.

In step 502, a consent request including one or more transaction criteria and at least two digital signatures may be received by a receiver (e.g., the receiving device 202) of a processing server (e.g., the processing server 200), where a first digital signature is generated by a regulating entity (e.g., the regulating entity 108) and a second digital signature is generated by a moderating entity in a blockchain network. In step 504, the first digital signature and the second digital signature may be validated by a processing device (e.g., the validation module 220) of the processing server.

In step 506, the received consent request may be digitally signed by the processing device (e.g., the generation module 222) of the processing server using a private key of a first cryptographic key pair. In step 508, the digitally signed consent request may be transmitted to the regulating entity by a transmitter (e.g., the transmitting device 224) of the processing server. In step 510, a query request may be received by the receiver of the processing server from the regulating entity, where the query request includes an executable query.

In step 512, the executable query may be executed by the processing device (e.g., the querying module 218) of the processing server to identify transaction data for one or more electronic transactions, where each of the one or more transactions complies with the one or more transaction criteria. In step 514, the identified transaction data may be transmitted by the transmitter of the processing server to the regulating entity.

In one embodiment, the consent request is received from the regulating entity. In some embodiments, the first digital signature may be validated using a public key of a second cryptographic key pair, and the second digital signature may be validated using a public key of a third cryptographic key pair. In one embodiment, the method 500 may further include executing, by the processing device (e.g., the querying module 218) of the processing server, a query to insert the digitally signed consent request into a second blockchain. In a further embodiment, the method 500 may even further include generating, by the processing device of the processing server, a hash value by applying one or more hashing algorithms to the digitally signed consent request, wherein inserting the digitally signed consent request into the second blockchain comprises inserting the hash value generated from the digitally signed consent request into the second blockchain.

In some embodiments, the executable query may be executed automatically by the processing device upon receipt of the query request. In one embodiment, the method 500 may further include validating, by the processing device (e.g., the validation module 220) of the processing server, the executable query for compliance with the one or more transaction criteria, wherein validation of the executable query is successful prior to executing the executable query. In one embodiment, the method 500 may also include encrypting, by the processing device of the processing server, the identified transaction data prior to a transmission to the regulating entity. In a further embodiment, the identified transaction data is encrypted using a public key of a second cryptographic key pair. In some embodiments, the one or more electronic transactions may include at least one of: payment card transactions and cryptographic currency transactions.

Computer System Architecture

Figure 6:
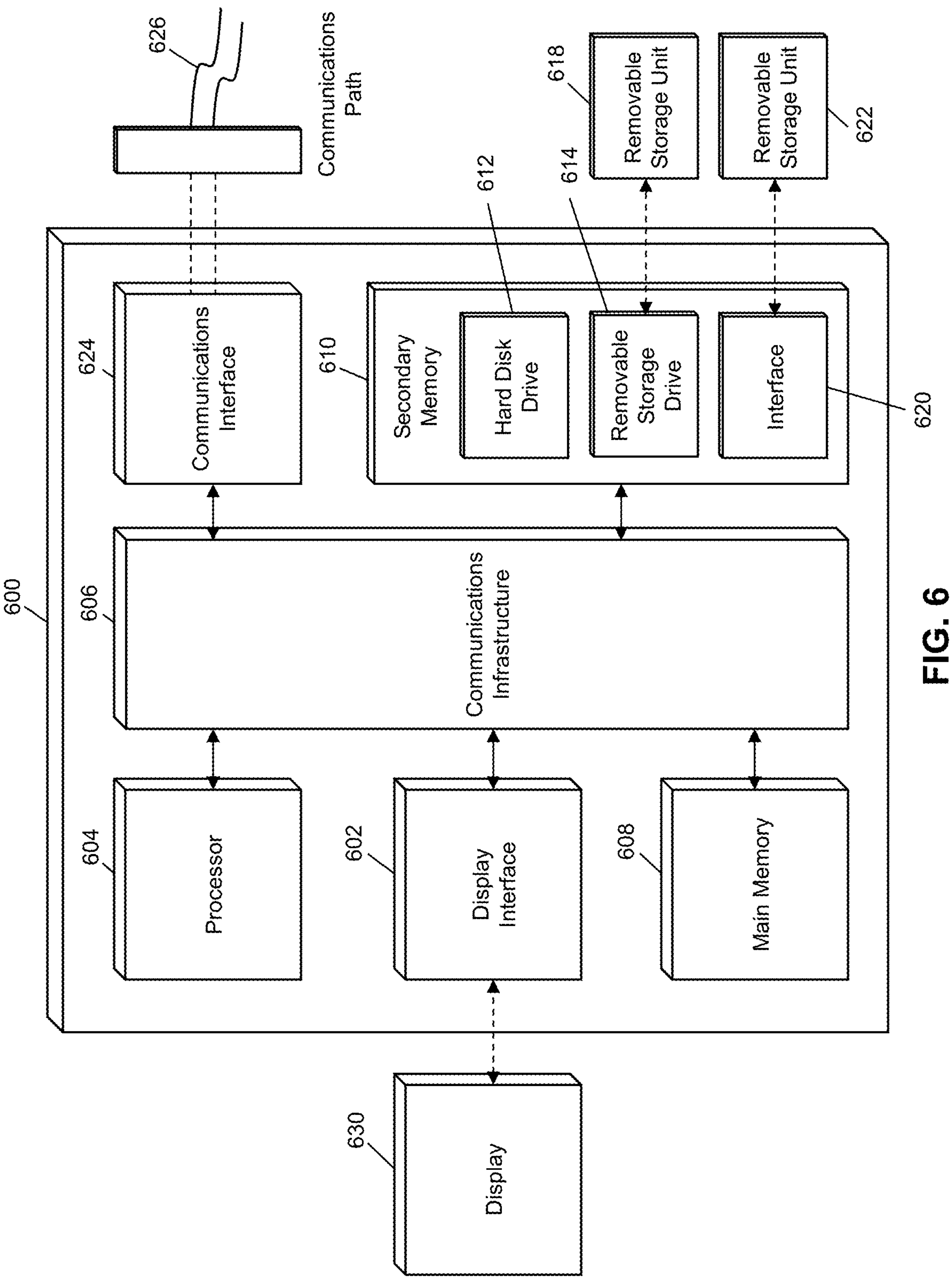
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the target entity 102 of FIG. 1 and processing server 200 of FIG. 2 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for automatically provisioning data for an opaque blockchain based on prior consent. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing consent for provisioning data in an opaque blockchain based on prior consent, comprising:
- receiving, by a receiver of a processing server, a consent request for data associated with a target entity stored on the opaque blockchain, the consent request including a digital signature generated by a regulating entity using a private key of a first cryptographic key pair;
- validating, by a processing device of the processing server, the digital signature of the regulating entity using a public key of the first cryptographic key pair;
- digitally signing, by the processing device of the processing server, the received consent request using a private key of a second cryptographic key pair;

transmitting, by a transmitter of the processing server, the digitally signed consent request to the target entity;

receiving, by the receiver of the processing server, a consent message digitally signed using a private key of a third cryptographic key pair associated with the target entity, the consent message being separate from the data associated with the target entity and the consent message granting the regulating entity access to the data associated with the target entity stored on the blockchain;

validating, by the processing device of the processing server, the digitally signed consent message using a public key of the third cryptographic key pair;

transmitting, by the transmitter of the processing server, the digitally signed consent message to the regulating entity;

receiving, by the receiver of the processing server, a revocation message revoking the signed consent message from the target entity, the revocation message being digitally signed using the private key of the third cryptographic key pair; and storing, by the processing device of the processing server, the revocation message in the opaque blockchain.

2. The method of claim 1, wherein the data associated with the target entity stored on the opaque blockchain is hashed data.

3. The method of claim 1, wherein the processing server is a moderating entity.

4. The method of claim 1, wherein the processing server is a node a blockchain network of the opaque blockchain.

5. The method of claim 1, further comprising: generating, by the processing device of the processing server, the first cryptographic key pair and the third cryptographic key pair; assigning, by the processing device of the processing server, the first cryptographic key pair to the regulating entity; and assigning, by the processing device of the processing server, the third cryptographic key pair to the target entity.

6. The method of claim 1, further comprising: storing, by the processing device of the processing server, the digitally signed consent message in a database.

7. The method of claim 1, wherein the digitally signed consent request is set to expire after a predetermined period of time.

8. The method of claim 1, further comprising: executing, by the processing device of the processing server, a query to insert the digitally signed consent message into a second blockchain; and inserting, by the processing device of the processing server, the digitally signed consent request into the second blockchain.

9. The method of claim 1, wherein the opaque blockchain is partitioned into a first partition and a second partition, the first partition storing the data associated with the target entity, and the second partition storing digitally signed consent messages, the method further comprising: executing, by the processing device of the processing server, a query to insert the digitally signed consent message into the second partition of the opaque blockchain; inserting, by the processing device of the processing server, the digitally signed consent request into the second partition of the opaque blockchain.

10. A system for providing consent for provisioning data in an opaque blockchain, comprising:

a regulating entity;

a target entity; and a processing server, the processing server configured to:

receive, by a receiver, a consent request for data associated with a target entity stored on the opaque blockchain, the consent request including a digital signature generated by a regulating entity using a private key of a first cryptographic key pair;

validate, by a processing device, the digital signature of the regulating entity using a public key of the first cryptographic key pair;

digitally sign, by the processing device, the received consent request using a private key of a second cryptographic key pair;

transmit, by a transmitter, the digitally signed consent request to the target entity;

receive, by the receiver, a consent message digitally signed using a private key of a third cryptographic key pair associated with the target entity, the consent message being separate from the data associated with the target entity and the consent message granting the regulating entity access to the data associated with the target entity stored on the blockchain;

validate, by the processing device, the digitally signed consent message using a public key of the third cryptographic key pair;

transmit, by the transmitter, the digitally signed consent message to the regulating entity;

receive, by the receiver, a revocation message from the target entity, the revocation message revoking the signed consent message and being digitally signed using the private key of the third cryptographic key pair; and store, by the processing device, the revocation message in the opaque blockchain.

11. The system of claim 10, wherein the data associated with the target entity stored on the opaque blockchain is hashed data.

12. The system of claim 10, wherein the processing server is a moderating entity.

13. The system of claim 10, wherein the processing server is a node a blockchain network of the opaque blockchain.

14. The system of claim 10, wherein the processing server is further configured to: generate, by the processing device, the first cryptographic key pair and the third cryptographic key pair; assign, by the processing device, the first cryptographic key pair to the regulating entity; and assign, by the processing device, the third cryptographic key pair to the target entity.

15. The system of claim 10, wherein the processing server is further configured to: store, by the processing device, the digitally signed consent message in a database.

16. The system of claim 10, wherein the digitally signed consent request is set to expire after a predetermined period of time.

17. The system of claim 10, wherein the processing server is further configured to: execute, by the processing device, a query to insert the digitally signed consent message into a second blockchain; and insert, by the processing device, the digitally signed consent request into the second blockchain.

18. The system of claim 10, wherein the opaque blockchain is partitioned into a first partition and a second partition, the first partition storing the data associated with the target entity, and the second partition storing digitally signed consent messages, the processing server is further configured to: execute, by the processing device, a query to insert the digitally signed consent message into the second partition of the opaque blockchain; insert, by the processing device, the digitally signed consent request into the second partition of the opaque blockchain.

* * * * *